United States Patent
Choi et al.

(10) Patent No.: US 12,451,191 B2
(45) Date of Patent: Oct. 21, 2025

(54) MEMORY DEVICE FOR PERFORMING PROGRAM OPERATION INCLUDING PROGRAM LOOPS AND METHOD OF OPERATING THE SAME

(71) Applicant: SK hynix Inc., Gyeonggi-do (KR)

(72) Inventors: Hyung Jin Choi, Gyeonggi-do (KR); Gwi Han Ko, Gyeonggi-do (KR); Chan Sik Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 205 days.

(21) Appl. No.: 18/346,782

(22) Filed: Jul. 4, 2023

(65) Prior Publication Data

US 2024/0233830 A1    Jul. 11, 2024

(30) Foreign Application Priority Data

Jan. 9, 2023  (KR) .................. 10-2023-0002883

(51) Int. Cl.
  *G11C 16/12*   (2006.01)
(52) U.S. Cl.
  CPC .................... *G11C 16/12* (2013.01)
(58) Field of Classification Search
  CPC ........................................ G11C 16/12
  USPC .................................... 365/185.18
  See application file for complete search history.

(56) References Cited

U.S. PATENT DOCUMENTS

2019/0325938 A1* 10/2019 Lee .............. G11C 16/10
2021/0134359 A1*  5/2021 Park ............. H10B 41/27

FOREIGN PATENT DOCUMENTS

KR  10-2017-0023348 A  3/2017
KR  10-2019-0034052 A  4/2019

* cited by examiner

*Primary Examiner* — Amir Zarabian
*Assistant Examiner* — Daniel J King
(74) *Attorney, Agent, or Firm* — IP & T GROUP LLP

(57) ABSTRACT

Provided herein may be a memory device for performing a program operation including program loops and a method of operating the same. The method of operating a memory device may include performing a first program loop of increasing threshold voltages of first memory cells selected by a first drain select line among a plurality of memory cells coupled to a word line, performing a second program loop of increasing threshold voltages of second memory cells selected by a second drain select line among the plurality of memory cells, and alternately repeating the first program loop and the second program loop such that respective threshold voltages of the first memory cells and the second memory cells are increased to respective threshold voltages corresponding to respective target program states.

20 Claims, 9 Drawing Sheets

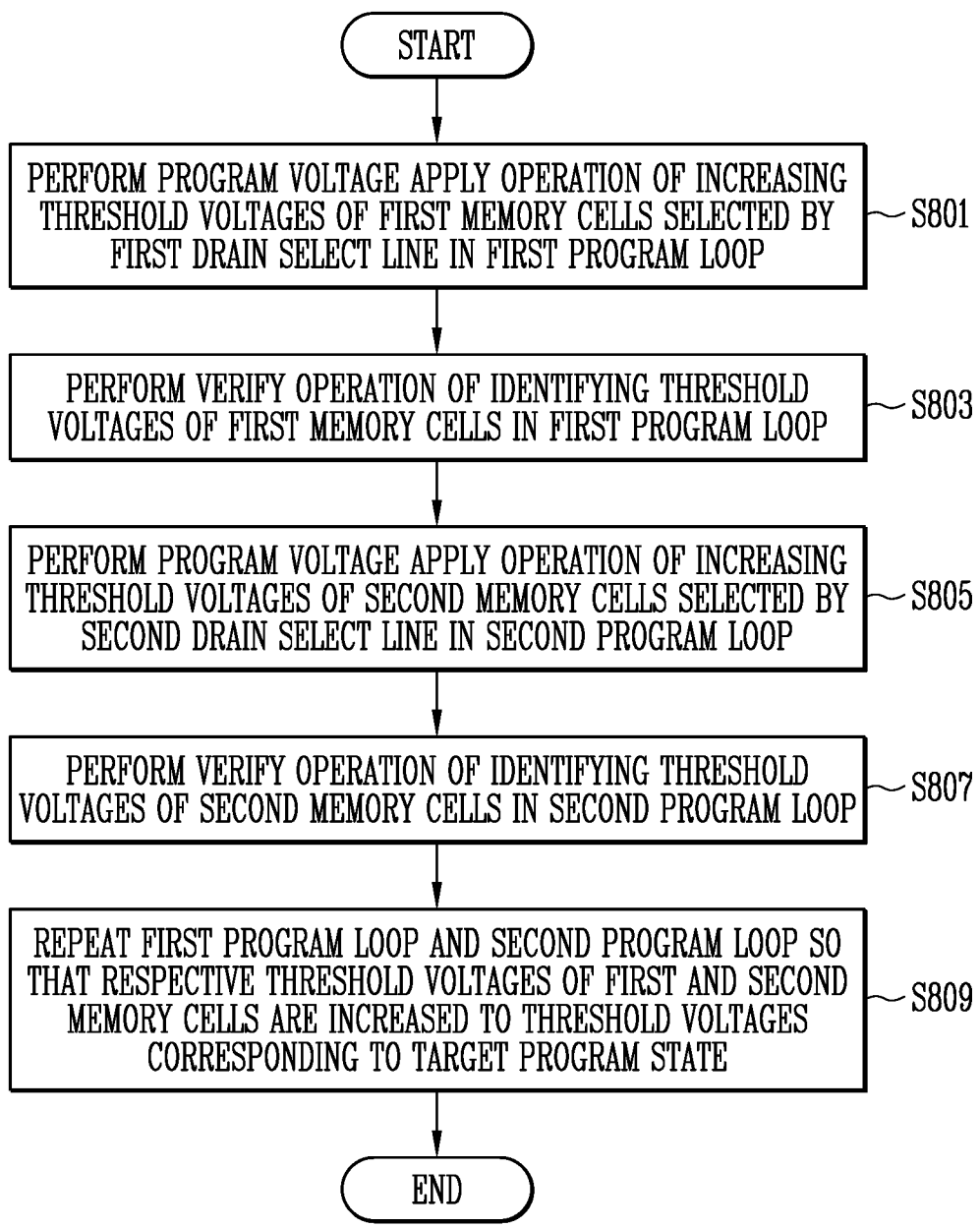

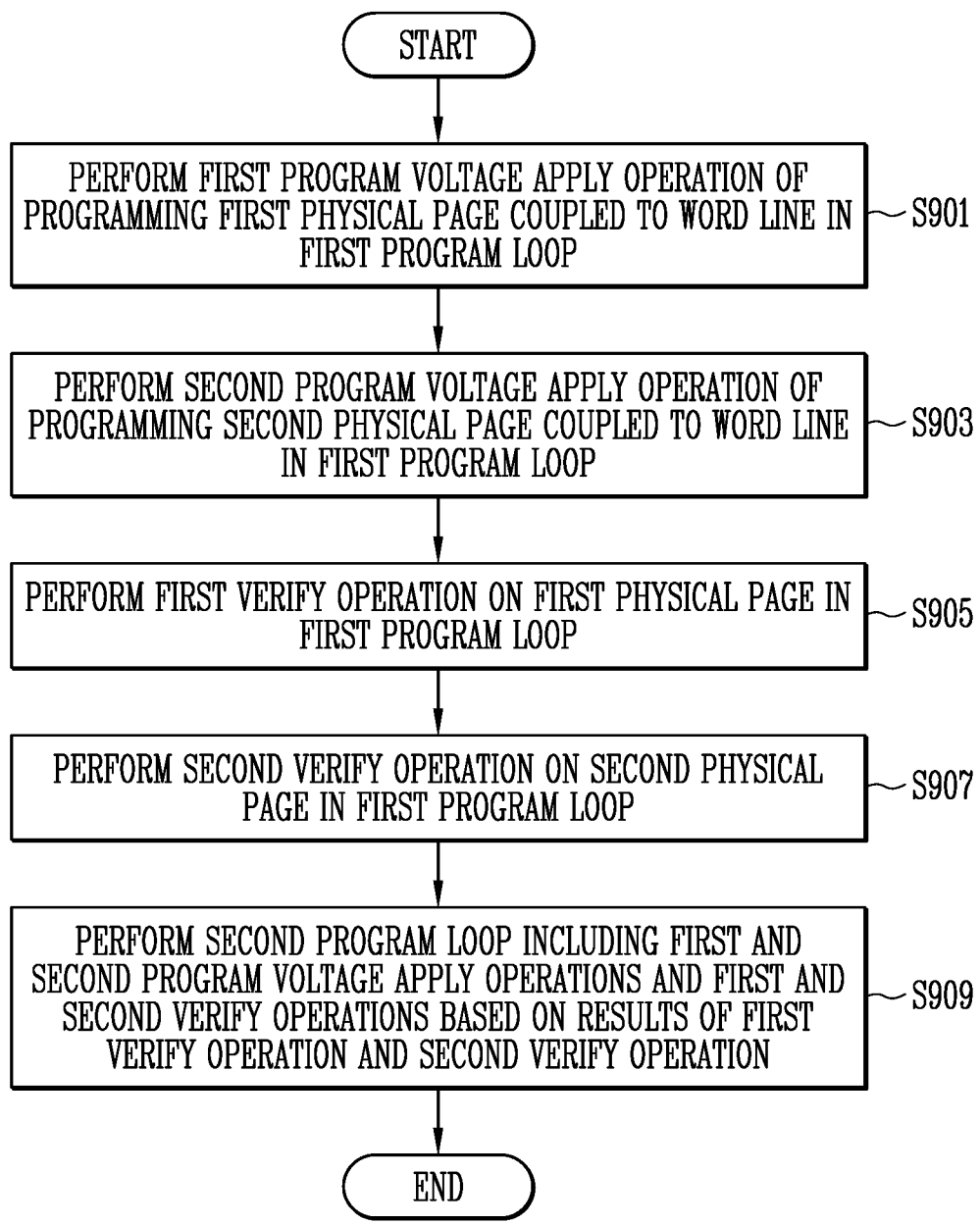

MEMORY DEVICE FOR PERFORMING PROGRAM OPERATION INCLUDING PROGRAM LOOPS AND METHOD OF OPERATING THE SAME

CROSS-REFERENCE TO RELATED APPLICATION

The present application claims priority under 35 U.S.C. § 119(a) to Korean patent application number 10-2023-0002883 filed on Jan. 9, 2023, the entire disclosure of which is incorporated by reference herein.

BACKGROUND

1. Field of Invention

Various embodiments of the present disclosure relate to an electronic device, and more particularly to a memory device and a method of operating the memory device.

2. Description of Related Art

A memory system is a device which stores data under the control of a host device such as a computer or a smartphone. The memory system may include a memory device in which data is stored and a memory controller which controls the memory device. Memory devices are classified into a volatile memory device and a nonvolatile memory device.

The nonvolatile memory device may be a memory device in which stored data is retained even when the supply of power is interrupted. Examples of the nonvolatile memory device may include a read only memory (ROM), a programmable ROM (PROM), an electrically programmable ROM (EPROM), an electrically erasable and programmable ROM (EEPROM), and a flash memory.

In a nonvolatile memory device having a three-dimensional (3D) structure, a plurality of physical pages, which are units of a program operation, may be coupled to one word line. A program operation may be sequentially performed on the plurality of physical pages coupled to one word line. However, when the threshold voltages of memory cells included in any of the plurality of physical pages coupled to the one word line are increased, the threshold voltages of memory cells included in other physical pages may also be changed.

SUMMARY

Various embodiments of the present disclosure are directed to a memory device that is capable of improving threshold voltage distributions of memory cells during a program operation, and a method of operating the memory device.

An embodiment of the present disclosure may provide a method of operating a memory device. The method may include performing a first program loop of increasing threshold voltages of first memory cells selected by a first drain select line among a plurality of memory cells coupled to a word line, performing a second program loop of increasing threshold voltages of second memory cells selected by a second drain select line among the plurality of memory cells, and alternately repeating the first program loop and the second program loop such that respective threshold voltages of the first memory cells and the second memory cells are increased to respective threshold voltages corresponding to respective target program states.

An embodiment of the present disclosure may provide a method of operating a memory device. The method may include performing, in a first program loop, a first program voltage apply operation of programming a first physical page coupled to a word line, performing, in the first program loop, a second program voltage apply operation of programming a second physical page coupled to the word line, performing, in the first program loop, a first verify operation of identifying threshold voltages of first memory cells included in the first physical page, performing, in the first program loop, a second verify operation of identifying threshold voltages of second memory cells included in the second physical page, and performing, based on results of the first verify operation and the second verify operation, a second program loop including the first and second program voltage apply operations and the first and second verify operations.

An embodiment of the present disclosure may provide a memory device. The memory device may include a plurality of memory cell string groups, each including a plurality of memory cell strings, a peripheral circuit configured to perform a program operation of storing data in first and second physical pages, the first physical page being included in a first one of the plurality of memory cell string groups and the second physical page being included in a second one of the plurality of memory cell string groups, and a program operation controller configured to control the peripheral circuit to perform, during the program operation, a plurality of program loops that alternately include first and second program loops, the first program loop programming the first physical page and the second program loop programming the second physical page.

An embodiment of the present disclosure may provide a memory device. The memory device may include first and second physical pages of memory cells coupled to a word line, and a control circuit configured to perform a sequence of first and second operations, and repeat the sequence to raise, to respective target levels, threshold voltages of the memory cells. The first operation raises the threshold voltages of one or more of the memory cells within the first page. The second operation raises the threshold voltages of one or more of the memory cells within the second page.

BRIEF DESCRIPTION OF THE DRAWINGS

FIG. 8 is a flowchart illustrating a plurality of program loops according to an embodiment of the present disclosure.

FIG. 9 is a flowchart illustrating a plurality of program loops according to an embodiment of the present disclosure.

DETAILED DESCRIPTION

Specific structural or functional descriptions in the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in the specification.

Figure 1:
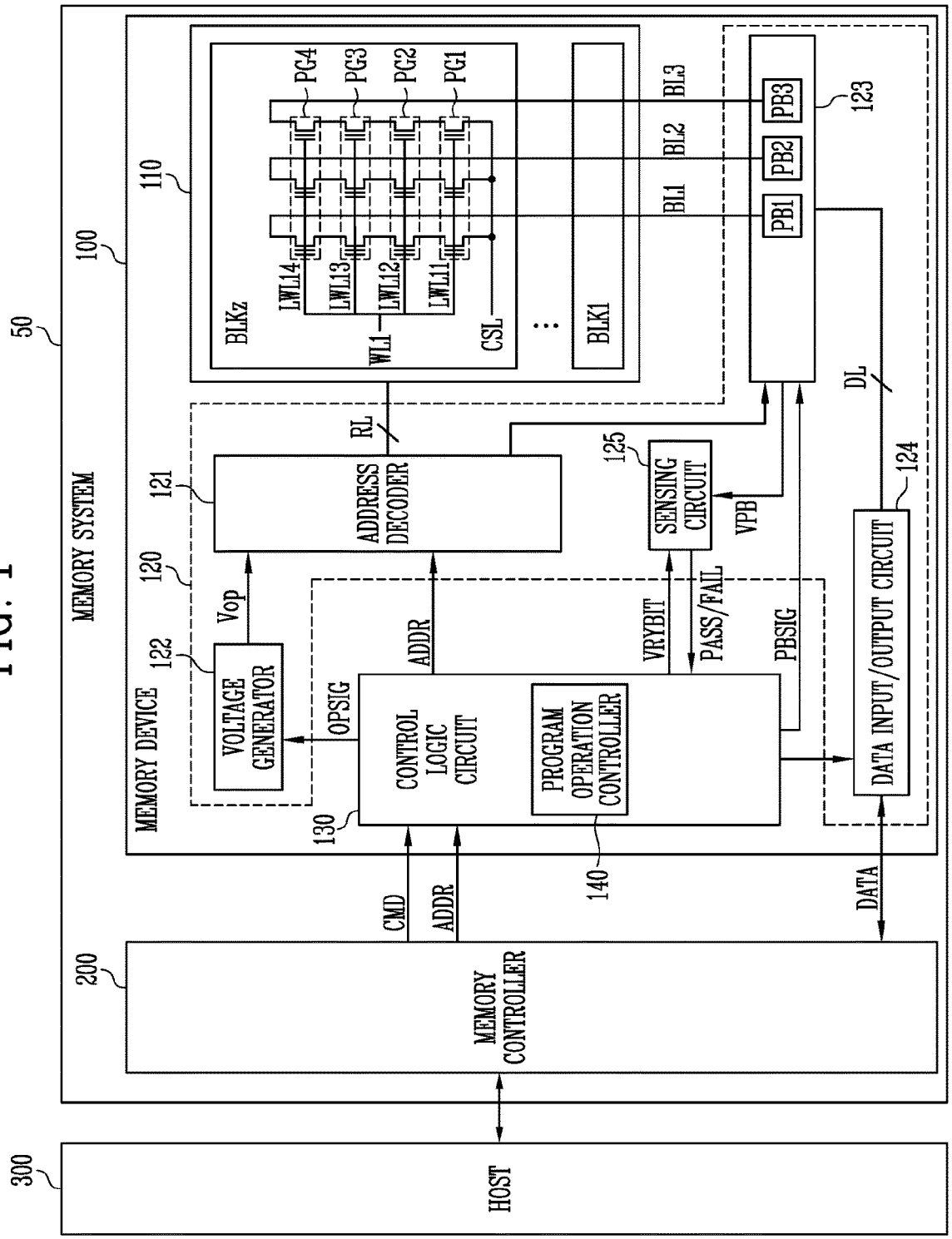
FIG. 1 is a diagram illustrating a memory system including a memory device according to an embodiment of the present disclosure.

FIG. 1 is a diagram illustrating a memory system including a memory device according to an embodiment of the present disclosure.

Referring to FIG. 1, a memory system 50 may include a memory device 100 and a memory controller 200. The memory device 100 may be a device which stores data under the control of a host 300 that is an external device. The memory system 50 may be manufactured as various types of storage devices such as a solid state drive (SSD) and a universal flash storage (UFS) depending on a host interface that is a scheme for communication with the host 300. The memory system 50 may be manufactured in various types of package forms such as a system-on-chip (SOC).

The memory device 100 may store data. The memory device 100 may be operated under the control of the memory controller 200. In an embodiment, the memory device 100 may be a nonvolatile memory device or a volatile memory device.

The memory device 100 may receive a command CMD and an address ADDR from the memory controller 200, and may access an area selected by the address ADDR. The memory device 100 may perform an operation indicated by the command CMD on the area selected by the address ADDR. The memory device 100 may perform a program operation (write operation) of storing data in the area selected by the address ADDR, a read operation of reading data, or an erase operation of erasing data.

In an embodiment, the memory device 100 may include a memory cell array 110, a peripheral circuit 120, and a control logic circuit 130.

The memory cell array 110 may include a plurality of memory blocks BLK1 to BLKz. The plurality of memory blocks BLK1 to BLKz may be coupled to an address decoder 121 through row lines RL. The plurality of memory blocks BLK1 to BLKz may be coupled to a page buffer group 123 through bit lines BL1 to BL3. Each of the memory blocks BLK1 to BLKz may include a plurality of memory cells. In an embodiment, the plurality of memory cells may be nonvolatile memory cells.

In an embodiment, a memory block BLKz of the plurality of memory blocks BLK1 to BLKz may be a memory block having a 3D structure. One word line in the memory block having a 3D structure may include a plurality of local word lines. Memory cells may be coupled to each of the local word lines. Memory cells coupled to one local word line may form one physical page. One physical page may be the unit of a program operation or a read operation. For example, memory cells coupled to an eleventh local word line LWL11 may form a first physical page PG1, and memory cells coupled to a twelfth local word line LWL12 may form a second physical page PG2. A plurality of physical pages may be coupled to one word line. For example, first to fourth physical pages PG1 to PG4 may be coupled to a first word line WL1.

A plurality of physical pages coupled to one word line may be respectively selected by different drain select lines. For example, the first physical page PG1 may be selected by a first drain select line, and the second physical page PG2 may be selected by a second drain select line. A detailed description of the 3D structure of the memory block will be made later with reference to FIGS. 5 to 7.

Each of the memory cells may be implemented as a single-level cell (SLC) capable of storing one bit of data, a multi-level cell (MLC) capable of storing two bits of data, a triple-level cell (TLC) capable of storing three bits of data, a quad-level cell (QLC) capable of storing four bits of data, or a memory cell capable of storing five or more bits of data.

One physical page may include data corresponding to a number of logical pages identical to the number of pieces of bit data that may be stored in each of memory cells. For example, when each memory cell is implemented as a triple-level cell, one physical page may include data of three logical pages.

The peripheral circuit 120 may drive the memory cell array 110. In an example, the peripheral circuit 120 may drive the memory cell array 110 so that a program operation, a read operation, and an erase operation are performed under the control of the control logic circuit 130. In an example, the peripheral circuit 120 may apply various operating voltages to the row lines RL and the bit lines BL1 to BL3 or discharge the applied voltages under the control of the control logic circuit 130.

The peripheral circuit 120 may include the address decoder 121, a voltage generator 122, the page buffer group 123, a data input/output circuit 124, and a sensing circuit 125.

The address decoder 121 may be coupled to the memory cell array 110 through the row lines RL. The row lines RL may include drain select lines, a plurality of word lines, source selection lines, and a common source line CSL.

The address decoder 121 may be operated in response to the control of the control logic circuit 130. The address decoder 121 may receive addresses ADDR from the control logic circuit 130.

The address decoder 121 may decode a block address, among the received addresses ADDR. The address decoder 121 may select at least one of the memory blocks BLK1 to BLKz according to the decoded block address. The address decoder 121 may decode a row address, among the received addresses ADDR. The address decoder 121 may select at least one word line of the selected memory block by applying voltages supplied from the voltage generator 122 to the at least one word line according to the decoded row address.

During a program operation, the address decoder 121 may apply a program voltage to the selected word line and apply a pass voltage having a level lower than that of the program voltage to unselected word lines. During a program verify operation, the address decoder 121 may apply a verify voltage to the selected word line and apply a verify pass voltage having a level higher than that of the verify voltage to the unselected word lines.

The address decoder 121 may decode a column address among the received addresses ADDR. The decoded column address may be transferred to the page buffer group 123. For example, the address decoder 121 may include components such as a row decoder, a column decoder, and an address buffer.

The voltage generator 122 may generate a plurality of operating voltages Vop using an external supply voltage that is supplied to the memory device 100. The voltage generator 122 may be operated under the control of the control logic circuit 130.

In an embodiment, the voltage generator 122 may generate an internal supply voltage by regulating the external supply voltage. The internal supply voltage generated by the voltage generator 122 may be used as an operating voltage for the memory device 100.

In an embodiment, the voltage generator 122 may generate various operating voltages Vop that are used for program, read, and erase operations in response to an operation signal OPSIG. The voltage generator 122 may generate the plurality of operating voltages Vop using the external supply voltage or the internal supply voltage. For example, the voltage generator 122 may generate a plurality of erase voltages, a plurality of program voltages, a plurality of pass voltages, a plurality of select read voltages, and a plurality of unselect read voltages. The generated operating voltages Vop may be supplied to the memory cell array 110 by the address decoder 121.

The page buffer group 123 may include first to third page buffers PB1 to PB3. The first to third page buffers PB1 to PB3 may be coupled to the memory cell array 110 through the first to third bit lines BL1 to BL3, respectively. The first to third page buffers PB1 to PB3 may be operated under the control of the control logic circuit 130. The number of page buffers and the number of bit lines illustrated in FIG. 1 are provided for convenience of description, and may be less than or greater than those illustrated in FIG. 1.

The first to third page buffers PB1 to PB3 may transmit/receive data DATA to/from the data input/output circuit 124. During a program operation, the first to third page buffers PB1 to PB3 may receive data DATA through the data input/output circuit 124 and data lines DL.

During a program operation, the first to third page buffers PB1 to PB3 may transfer data DATA, received through the data input/output circuit 124, to selected memory cells through the bit lines BL1 to BL3. The memory cells in the selected page may be programmed based on the received data DATA. Memory cells coupled to a bit line to which a program-enable voltage (e.g., a ground voltage) is applied may have increased threshold voltages. The threshold voltages of memory cells coupled to a bit line to which a program-inhibit voltage (e.g., a supply voltage) is applied may be maintained. During a verify operation, the first to third page buffers PB1 to PB3 may read the data DATA stored in the selected memory cells from the selected memory cells through the bit lines BL1 to BL3.

The data input/output circuit 124 may be coupled to the first to third page buffers PB1 to PB3 through the data lines DL. The data input/output circuit 124 may be operated under the control of the control logic circuit 130.

The data input/output circuit 124 may include a plurality of input/output buffers (not illustrated) which receive input data DATA. During a program operation, the data input/output circuit 124 may receive the data DATA to be stored from the memory controller 200.

During a verify operation, the sensing circuit 125 may generate a reference current in response to an enable bit signal VRYBIT generated by the control logic circuit 130, and may output a pass signal or a fail signal to the control logic circuit 130 by comparing a sensing voltage VPB received from the page buffer group 123 with a reference voltage generated by the reference current. In an example, the sensing circuit 125 may output a pass signal to the control logic circuit 130 when the magnitude of the sensing voltage VPB is less than that of the reference voltage. In an example, the sensing circuit 125 may output a fail signal to the control logic circuit 130 when the magnitude of the sensing voltage VPB is greater than that of the reference voltage.

The control logic circuit 130 may be coupled to the address decoder 121, the voltage generator 122, the page buffer group 123, the data input/output circuit 124, and the sensing circuit 125. The control logic circuit 130 may control the overall operation of the memory device 100. The control logic circuit 130 may be operated in response to the command CMD received from the memory controller 200.

The control logic circuit 130 may control the peripheral circuit 120 by generating various types of signals in response to the command CMD and the address ADDR. For example, the control logic circuit 130 may generate the operation signal OPSIG, the addresses ADDR, a page buffer control signal PBSIG, and the enable bit signal VRYBIT in response to the command CMD and the address ADDR. The control logic circuit 130 may output the operation signal OPSIG to the voltage generator 122, may output the addresses ADDR to the address decoder 121, may output the page buffer control signal PBSIG to the page buffer group 123, and may output the enable bit signal VRYBIT to the sensing circuit 125. In addition, the control logic circuit 130 may determine whether a verify operation has passed or failed in response to the pass or fail signal PASS or FAIL output from the sensing circuit 125.

In an embodiment, the control logic circuit 130 may include a program operation controller 140. The program operation controller 140 may control a program operation performed on memory cells. The program operation may be an operation of storing data in the memory cells. In detail, the program operation may be an operation of increasing the threshold voltages of memory cells depending on the data to be stored in the memory cells. Each of the memory cells may have a threshold voltage corresponding to one of a plurality of program states according to the program operation. Each of the memory cells may have one of the plurality of program states as a target program state depending on the data to be stored in the corresponding memory cell.

In an embodiment, the program operation may include a plurality of program loops. Each program loop may include a program voltage apply operation and a verify operation. The program voltage apply operation may be an operation of increasing the threshold voltages of memory cells using a program voltage. The verify operation may be an operation of identifying, using a verify voltage, whether the threshold voltages of the memory cells have reached respective threshold voltages corresponding to respective target program states.

In an embodiment, the program operation controller 140 may control the peripheral circuit 120 to alternately program a plurality of physical pages coupled to one word line. For example, a first physical page PG1 and a second physical page PG2 coupled to the first word line WL1 may be alternately programmed, and a third physical page PG3 and a fourth physical page PG4 coupled to the first word line WL1 may be alternately programmed.

In an embodiment, the program operation controller 140 may control the peripheral circuit 120 to alternately perform a first program loop for programming the first physical page PG1 coupled to the first word line WL1 and a second program loop for programming the second physical page PG2 coupled to the first word line WL1. The first program loop and the second program loop may be repeated such that respective threshold voltages of first memory cells included in the first physical page PG1 and second memory cells included in the second physical page PG2 are increased to respective threshold voltages corresponding to the respective target program states.

In an embodiment, the program operation controller 140 may control the peripheral circuit 120 to perform a plurality of program loops, each including a program voltage apply operation on the first physical page PG1, a program voltage apply operation on the second physical page PG2, a verify operation on the first physical page PG1, and a verify operation on the second physical page PG2. The program operation controller 140 may control the peripheral circuit 120 to perform a plurality of program loops of increasing respective threshold voltages of the first memory cells included in the first physical page PG1 and the second memory cells included in the second physical page PG2 up to respective threshold voltages corresponding to the respective target program states.

The memory controller 200 may control the overall operation of the memory system 50.

The memory controller 200 may control the memory device 100 to perform a write operation, a read operation or an erase operation in response to a request received from the host 300. The memory controller 200 may provide a command, a physical address, or data to the memory device 100 depending on the write operation, the read operation or the erase operation.

In an embodiment, the memory controller 200 may internally generate a command, an address, and data regardless of whether a request from the host 300 is received, and may transmit them to the memory device 100. For example, the memory controller 200 may provide the memory device 100 with commands, addresses, and data required in order to perform read operations and write operations that are involved in performing wear leveling, read reclaim, garbage collection, etc.

The host 300 may communicate with the memory system 50 using various communication schemes such as a dual in-line memory module (DIMM).

Figure 2:
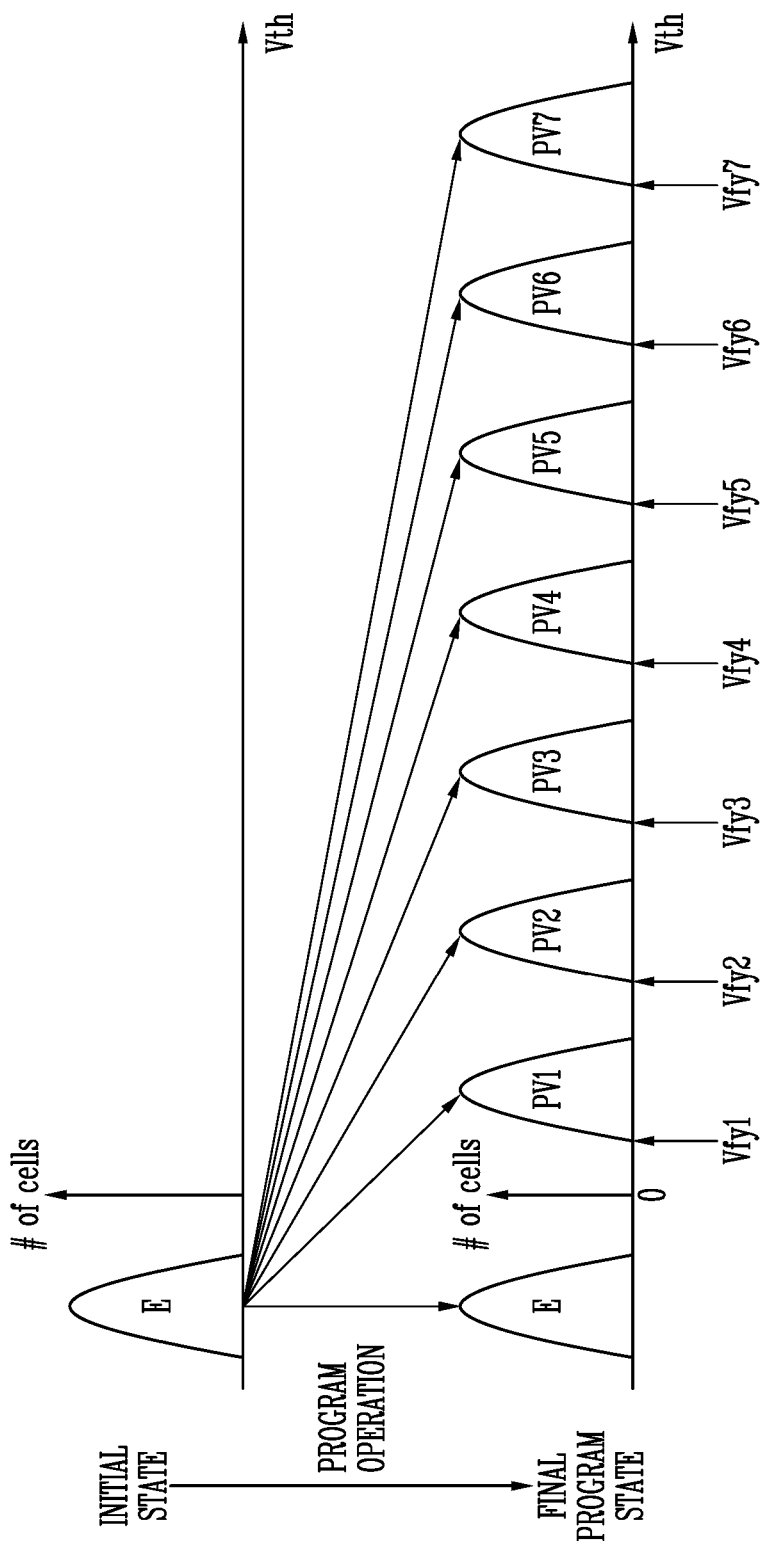
FIG. 2 is a diagram illustrating threshold voltage distributions of memory cells depending on a program operation.

FIG. 2 is a diagram illustrating threshold voltage distributions of memory cells depending on a program operation.

In FIG. 2, the horizontal axis of each graph indicates threshold voltages Vth of memory cells, and the vertical axis thereof indicates the number of memory cells (# of cells).

Referring to FIG. 2, the threshold voltage distribution of memory cells may change from an initial state to a final program state depending on the program operation.

In FIG. 2, a description is made on that data is programmed according to a TLC scheme in which one memory cell stores three bits of data.

The initial state may be the state in which a program operation is not performed and in which the threshold voltage distribution of the memory cells is in an erase state E.

The final program state may be the threshold voltage distribution of memory cells on which the program operation has been performed. Each of the memory cells on which the program operation has been performed may have a threshold voltage corresponding to one of a plurality of program states. For example, when data is programmed according to a triple-level cell (TLC) scheme in which three bits of data are stored in one memory cell, the plurality of program states may indicate the erase state E and first to seventh program states PV1 to PV7. In an embodiment, each of the memory cells on which the program operation has been performed may have a threshold voltage corresponding to one of the erase state E and the first to seventh program states PV1 to PV7. The threshold voltage of each memory cell in the initial state may be increased to the threshold voltage corresponding to one of the erase state E and the first to seventh program states PV1 to PV7 through the program operation.

Each memory cell may have one of the erase state E and the program states PV1 to PV7 as a target program state. The target program state may be determined depending on the data to be stored in the corresponding memory cell. Each memory cell may have one of the erase state E and the first to seventh program states PV1 to PV7, which are the plurality of program states, as the target program state depending on the data to be stored. Each memory cell may have a threshold voltage corresponding to the target program state, among the plurality of program states, depending on the program operation.

Figure 3:
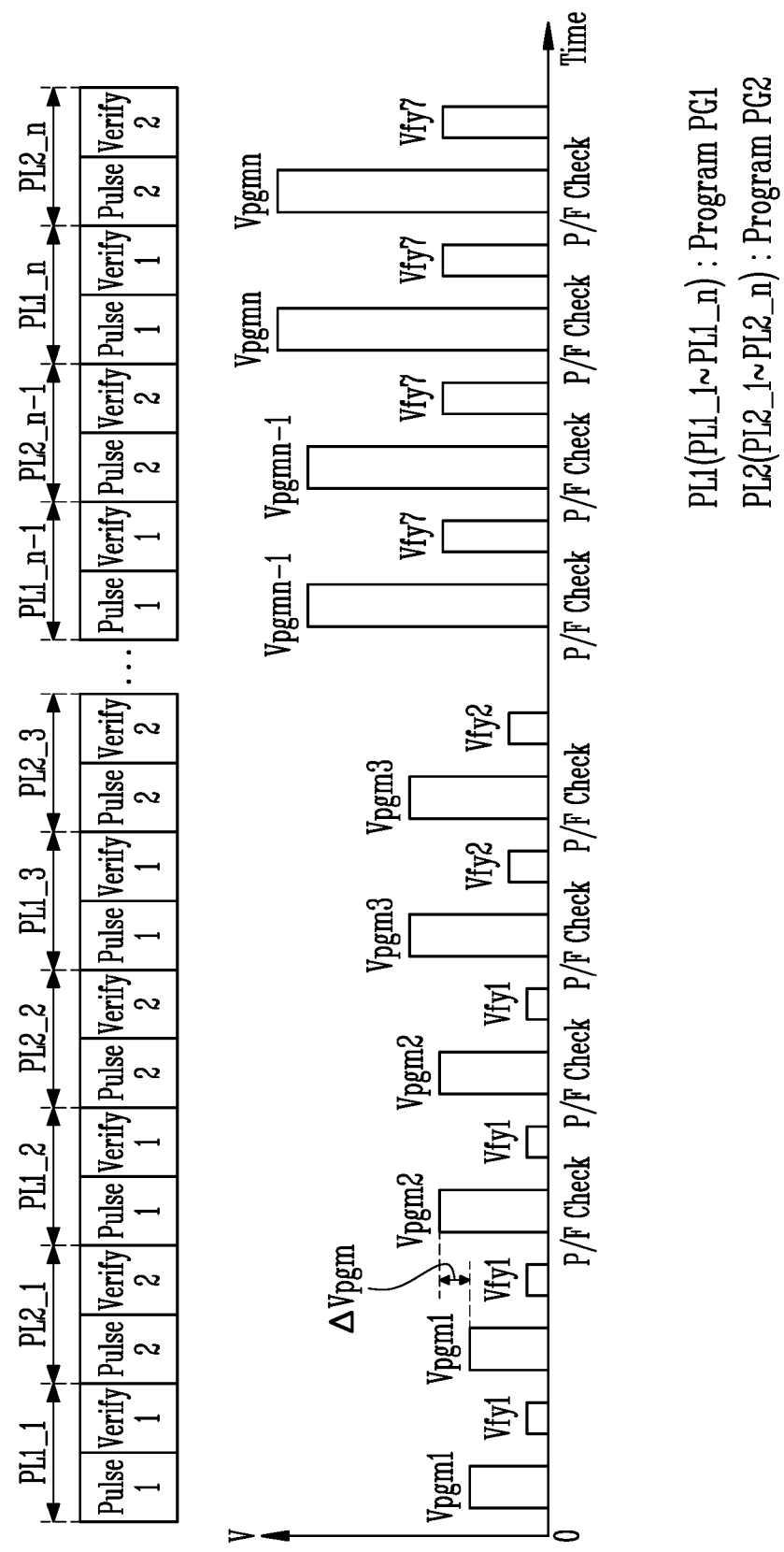
FIG. 3 is a diagram illustrating a plurality of program loops alternately performed on a first physical page and a second physical page according to an embodiment of the present disclosure.

FIG. 3 is a diagram illustrating a plurality of program loops alternately performed on a first physical page and a second physical page according to an embodiment of the present disclosure.

In FIG. 3, the horizontal axis of a graph indicates time and the vertical axis thereof indicates voltage V applied to a word line. The voltage V applied to the word line may include a program voltage Vpgm and a verify voltage Vfy.

In FIG. 3, a description is made on that data is programmed according to a TLC scheme in which one memory cell stores three bits of data. However, the scope of the present disclosure is not limited thereto, and one memory cell may be programmed to store two or fewer bits of data or to store four or more bits of data.

Referring to FIG. 3, the memory device 100 may perform a program operation. The program operation may be configured to perform a plurality of program loops alternately including a first program loop PL1 and a second program loop PL2. In an embodiment, referring to FIG. 1, the first program loop PL1 may be performed on a first physical page coupled to the first word line, and the second program loop PL2 may be performed on a second physical page coupled to the first word line. In an embodiment, the first program loop PL1 may be performed on a third physical page coupled to the first word line, and the second program loop PL2 may be performed on a fourth physical page coupled to the first word line.

In an embodiment, the first program loop PL1 may include 1_1-th to 1_n-th program loops PL1_1 to PL1_$n$. Each of the 1_1-th to 1_n-th program loops PL1_1 to PL1_$n$ may include a first program voltage apply operation Pulse1 of increasing the threshold voltages of the first memory cells included in the first physical page and a first verify operation Verify1 of identifying the threshold voltages of the first memory cells based on a verify voltage.

In an embodiment, the second program loop PL2 may include 2_1-th to 2_n-th program loops PL2_1 to PL2_$n$. Each of the 2_1-th to 2_n-th program loops PL2_1 to PL2_$n$ may include a second program voltage apply operation Pulse2 of increasing the threshold voltages of second memory cells included in the second physical page and a second verify operation Verify2 of identifying the threshold voltages of the second memory cells based on a verify voltage.

In detail, in the 1_1-th program loop PL1-1, after applying a first program voltage Vpgm1 to the first word line coupled to the first memory cells, the memory device 100 may apply a first verify voltage Vfy1 to the first word line. Among the physical pages coupled to the first word line, the first physical page including the first memory cells may be selected by a first drain select line. For example, the memory device 100 may apply a turn-on voltage to the first drain select line and apply a ground voltage to a second drain select line to select the first physical page. In an embodiment, the turn-on voltage may be a voltage higher than the threshold voltages of drain select transistors coupled to the first drain select line.

The first verify voltage Vfy1 may be a voltage used for a verify operation on memory cells having a first program state as a target program state, among the first memory cells. The memory device 100 may identify whether the threshold voltages of the first memory cells are higher than the first verify voltage Vfy1 in the first verify operation.

In the 2_1-th program loop PL2-1, after applying the first program voltage Vpgm1 to the first word line coupled to the second memory cells, the memory device 100 may apply the first verify voltage Vfy1 to the first word line. Among the physical pages coupled to the first word line, the second physical page including the second memory cells may be selected by a second drain select line. For example, the memory device 100 may apply the turn-on voltage to the second drain select line and apply the ground voltage to the first drain select line to select the second physical page.

In an embodiment, in the 1_1-th program loop PL1_1 and the 2_1-th program loop PL2_1, the magnitudes of the program voltages applied to the first word line and the magnitudes of the verify voltages applied thereto may be respectively equal to each other.

In the first program voltage apply operation Pulse1 included in the 1_2-th program loop PL1_2, the memory device 100 may apply a second program voltage Vpgm2, higher than the first program voltage Vpgm1 by a unit program voltage ΔVpgm, to the first word line coupled to the first memory cells. The memory device 100 may perform a pass/fail check operation (P/F Check) on the first memory cells while applying the second program voltage Vpgm2 to the first word line. The pass/fail check operation (P/F Check) may be an operation of determining whether the result of a verify operation indicates 'pass' or 'fail.' When the pass/fail check operation (P/F Check) has passed, the result of the verify operation may indicate 'pass.' When the pass/fail check operation (P/F Check) has failed, the result of the verify operation may indicate 'fail.'

The memory device 100 may perform, in the first program voltage apply operation Pulse1 included in the 1_2-th program loop PL1_2, the pass/fail check operation (P/F Check) of comparing the number of on-cells having threshold voltages lower than the first verify voltage Vfy1, among the first memory cells, with the reference number of on-cells. When the number of on-cells is greater than the reference number of on-cells in the pass/fail check operation (P/F Check), the result of the first verify operation may indicate 'fail.' When the result of the first verify operation indicates 'fail', it may be determined that the threshold voltages of the first memory cells have not increased to threshold voltages corresponding to the first program state.

Thereafter, during the first verify operation Verify1 included in the 1_2-th program loop PL1_2, the memory device 100 may apply the first verify voltage Vfy1 to the first word line to identify the threshold voltages of the first memory cells increased by the second program voltage Vpgm2.

During the second program voltage apply operation Pulse2 included in the 2_2-th program loop PL2_2, the memory device 100 may apply the second program voltage Vpgm2 to the first word line coupled to the second memory cells. The memory device 100 may perform a pass/fail check operation (P/F Check) on the second memory cells while applying the second program voltage Vpgm2 to the first word line. The memory device 100 may perform, in the second program voltage apply operation Pulse2 included in the 2_2-th program loop PL2_2, the pass/fail check operation (P/F Check) of comparing the number of on-cells having threshold voltages lower than the first verify voltage Vfy1, among the second memory cells, with the reference number of on-cells. When the number of on-cells is greater than the reference number of on-cells in the pass/fail check operation (P/F Check), the result of the second verify operation may indicate 'fail.'

Thereafter, during the second verify operation Verify2 included in the 2_2-th program loop PL2_2, the memory device 100 may apply the first verify voltage Vfy1 to the first word line to identify the threshold voltages of the second memory cells increased by the second program voltage Vpgm2.

During the first program voltage apply operation Pulse1 included in the 1_3-th program loop PL1_3, the memory device 100 may apply a third program voltage Vpgm3, higher than the second program voltage Vpgm2, to the first word line coupled to the first memory cells. The memory device 100 may perform a pass/fail check operation (P/F Check) on the first memory cells while applying the third program voltage Vpgm3 to the first word line. When the number of on-cells having threshold voltages lower than the first verify voltage Vf1, among the first memory cells, is less than the reference number of on-cells in the pass/fail check operation (P/F Check), the pass/fail check operation (P/F Check) may indicate 'pass.' When the result of the first verify operation indicates 'pass', it may be determined that the threshold voltages of memory cells having the first program state as the target program state, among the first memory cells, have increased to threshold voltages corresponding to the first program state.

Thereafter, during the first verify operation Verify1 included in the 1_3-th program loop PL1_3, the memory device 100 may apply a second verify voltage Vfy2 to the first word line to identify the threshold voltages of the memory cells having the second program state as the target program state, among the first memory cells.

During the second program voltage apply operation Pulse2 included in the 2_3-th program loop PL2_3, the memory device 100 may apply the third program voltage Vpgm3, higher than the second program voltage Vpgm2, to the first word line coupled to the second memory cells. The memory device 100 may perform a pass/fail check operation (P/F Check) on the second memory cells while applying the third program voltage Vpgm3 to the first word line. When the number of on-cells having threshold voltages lower than the first verify voltage Vfy1, among the second memory cells, is less than the reference number of on-cells in the pass/fail check operation (P/F Check), the pass/fail check operation (P/F Check) may indicate 'pass.'

Thereafter, during the second verify operation Verify2 included in the 2_3-th program loop PL2_3, the memory device 100 may apply a second verify voltage Vfy2 to the first word line to identify the threshold voltages of the memory cells having the second program state as the target program state, among the second memory cells.

The memory device 100 may perform a pass/fail check operation on memory cells having second to seventh program states as the target program state in the same manner as the pass/fail check operation on the memory cells having the first program state as the target program state, among the first memory cells or the second memory cells. In an embodiment, when the pass/fail check operation for the second program state has passed, a pass/fail check operation for a third program state may be performed.

In an embodiment, in the 1_n-th program loop PL1_n, after applying an n-th program voltage Vpgmn to the first word line coupled to the first memory cells, the memory device 100 may apply a seventh verify voltage Vfy7 to the first word line. In the 1-n-th program loop PL1_n, the memory device 100 may perform the pass/fail check operation (P/F check) on memory cells having a seventh program state as the target program state, among the first memory cells. When the pass/fail check operation for the seventh program state has passed, it may be determined that the first memory cells have respective threshold voltages corresponding to the target program state. When the pass/fail check operation for the seventh program state has passed, the first program loop PL1 may be no longer performed. However, unlike the example illustrated in FIG. 3, the pass/fail check operation for the seventh program state has failed, the memory device 100 may perform a (1_n+1)-th program loop on the first memory cells.

In an embodiment, in a 2_n-th program loop PL2_n, when the pass/fail check operation for the seventh program state has passed, the memory device 100 may determine that the second memory cells have respective threshold voltages corresponding to the target program state. When the pass/fail check operation for the seventh program state has passed, the second program loop PL2 may be no longer performed. However, the pass/fail check operation for the seventh program state has failed, the memory device 100 may perform a (2_n+1)-th program loop on the second memory cells.

In an embodiment, when the pass/fail check operation performed in the 1_n-th program loop PL1_n has failed and the pass/fail check operation performed in the 2_n-th program loop PL2_n has passed, the memory device 100 may perform only the (1_n+1)-th program loop on the first memory cells, and may not perform a second program loop PL2 thereon.

In an embodiment, when the pass/fail check operation performed in the 1_n-th program loop PL1_n has passed and the pass/fail check operation performed in the 2_n-th program loop PL2_n has failed, the memory device 100 may perform only the (2_n+1)-th program loop on the second memory cells, and may not perform the first program loop PL1 thereon.

In an embodiment, the program voltage may be determined based on an incremental step pulse programming (ISPP) scheme. The magnitude of the program voltage may be stepwise increased or decreased as the first program loop PL1 and the second program loop PL2 are repeated. The number of applications of program voltages used in respective program loops, the voltage levels of the program voltages, voltage applications times, etc. may be determined in various forms under the control of the memory controller.

In an embodiment, the memory device 100 may stepwise increase the magnitude of the program voltage based on the number of repetitions of the first program loop PL1 and the second program loop PL2. For example, after the 1_1-th program loop PL1_1 and the 1_2-th program loop PL1_2 are repeated, the memory device 100 may increase the magnitude of the program voltage to the second program voltage Vpgm2. After the 1_2-th program loop PL1_2 and the 2_2-th program loop PL2_2 are repeated, the memory device 100 may increase the magnitude of the program voltage to the third program voltage Vpgm3.

In an embodiment, the memory device 100 may repeatedly perform a first program loop PL1 of programming the first physical page between the first physical page and the second physical page coupled to the first word line and a second program loop PL2 of programming the second physical page during the program operation. In an embodiment, the first program loop PL1 and the second program loop PL2 may be repeated until the threshold voltages of the first memory cells and the second memory cells are increased up to the respective threshold voltages corresponding to the respective target program states.

Figure 4:
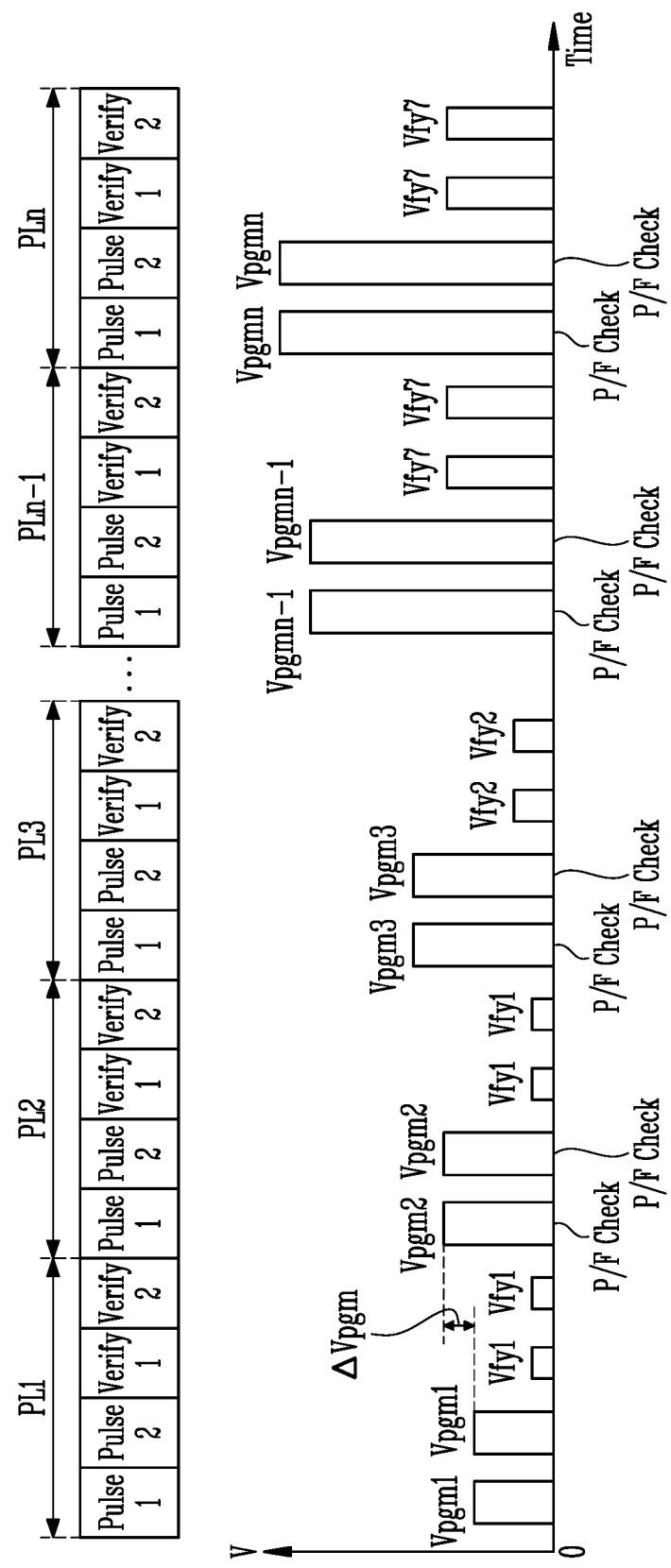
FIG. 4 is a diagram illustrating a plurality of program loops according to an embodiment of the present disclosure.

FIG. 4 is a diagram illustrating a plurality of program loops according to an embodiment of the present disclosure.

In FIG. 4, the horizontal axis of a graph indicates time and the vertical axis thereof indicates voltage V applied to a word line. The voltage V applied to the word line may include a program voltage Vpgm and a verify voltage Vfy.

Referring to FIG. 4, the memory device 100 may perform a program operation including a plurality of program loops PL1 to PLn. Each of the plurality of program loops PL1 to PLn may include a first program voltage apply operation Pulse1, a second program voltage apply operation Pulse2, a first verify operation Verify1, and a second verify operation Verify2.

The first program voltage apply operation Pulse1 may be an operation of applying a program voltage to a first word line and increasing the threshold voltages of first memory cells included in a first physical page. The memory device 100 may apply a turn-on voltage to a first drain select line and apply a ground voltage to a second drain select line while performing the first program voltage apply operation Pulse1.

The second program voltage apply operation Pulse2 may be an operation of applying a program voltage to the first word line and increasing the threshold voltages of second memory cells included in a second physical page. The memory device 100 may apply the turn-on voltage to the second drain select line and apply the ground voltage to the first drain select line while performing the second program voltage apply operation Pulse2.

The first verify operation Verify1 may be an operation of identifying the threshold voltages of the first memory cells using a verify voltage. The second verify operation Verify2 may be an operation of identifying the threshold voltages of the second memory cells using the verify voltage.

In an embodiment, the memory device 100 may sequentially perform the first program voltage apply operation Pulse1, the second program voltage apply operation Pulse2, the first verify operation Verify1, and the second verify operation Verify2 in the first program loop PL1. In the first program loop PL1, the memory device 100 may increase the threshold voltages of the first memory cells and increase the threshold voltages of the second memory cells using a first program voltage Vpgm1, and thereafter may identify whether the threshold voltages of the first memory cells are higher than a first verify voltage Vfy1 and identify whether the threshold voltages of the second memory cells are higher than a second verify voltage Vfy2. The first verify voltage Vfy1 may be a voltage corresponding to a first program state.

In the second program loop PL2, the memory device 100 may perform the first program voltage apply operation Pulse1 on the first memory cells and the second program voltage apply operation Pulse2 on the second memory cells using a second program voltage Vpgm2 higher than the first program voltage Vpgm1 by a unit program voltage ΔVpgm. The memory device 100 may perform a pass/fail check operation (P/F check) on the first memory cells while performing the first program voltage apply operation Pulse1.

The memory device 100 may perform the pass/fail check operation (P/F check) on the second memory cells while performing the second program voltage apply operation Pulse2.

In the second program loop PL2, the memory device 100 may perform a first verify operation Verify1 on the first memory cells and a second verify operation Verify2 on the second memory cells using the first verify voltage Vfy1.

In the third program loop PL3, the memory device 100 may perform a first program voltage apply operation Pulse1 on the first memory cells and a second program voltage apply operation Pulse2 on the second memory cells using a third program voltage Vpgm3. When the pass/fail check operation on the first memory cells and the pass/fail check operation on the second memory cells have passed, the memory device 100 may perform a first verify operation Verify1 on the first memory cells and a second verify operation Verify2 on the second memory cells using a second verify voltage Vfy2.

In an embodiment, in the n-th program loop PLn, the memory device 100 may perform a first program voltage apply operation Pulse1 on the first memory cells and a second program voltage apply operation Pulse2 on the second memory cells using an n-th program voltage Vpgmn. In the n-th program loop PLn, the memory device 100 may perform a first verify operation Verify1 on the first memory cells and a second verify operation Verify2 on the second memory cells using a seventh verify voltage Vfy7.

In an embodiment, in the n-th program loop PLn, when a pass/fail check operation on the first memory cells and a pass/fail check operation on the second memory cells have passed, the program operation may be terminated. In an embodiment, the pass/fail check operations performed in the n-th program loop PLn may be pass/fail check operations for a seventh program state.

In an embodiment, when the pass/fail check operation on the first memory cells and the pass/fail check operation on the second memory cells have failed in the n-th program loop PLn, the memory device 100 may perform an n+1-th program loop including a first program voltage apply operation Pulse1, a second program voltage apply operation Pulse2, a first verify operation Verify1 and a second verify operation Verify2.

In an embodiment, when the pass/fail check operation on the first memory cells has failed and the pass/fail check operation on the second memory cells has passed in the n-th program loop PLn, the memory device 100 may perform the n+1-th program loop including the first program voltage apply operation Pulse1 and the first verify operation Verify1 on the first memory cells.

In an embodiment, when the pass/fail check operation on the first memory cells has passed and the pass/fail check operation on the second memory cells has failed in the n-th program loop PLn, the memory device 100 may perform an n+1-th program loop including the second program voltage apply operation Pulse2 and the second verify operation Verify2 on the second memory cells.

In an embodiment, the memory device 100 may perform the plurality of program loops PL1 to PLn, each including a first program voltage apply operation Pulse1, a second program voltage apply operation Pulse2, a first verify operation Verify1 and a second verify operation Verify2, so that the threshold voltages of the first memory cells and the second memory cells are simultaneously increased to respective threshold voltages corresponding to respective target program states.

Figure 5:
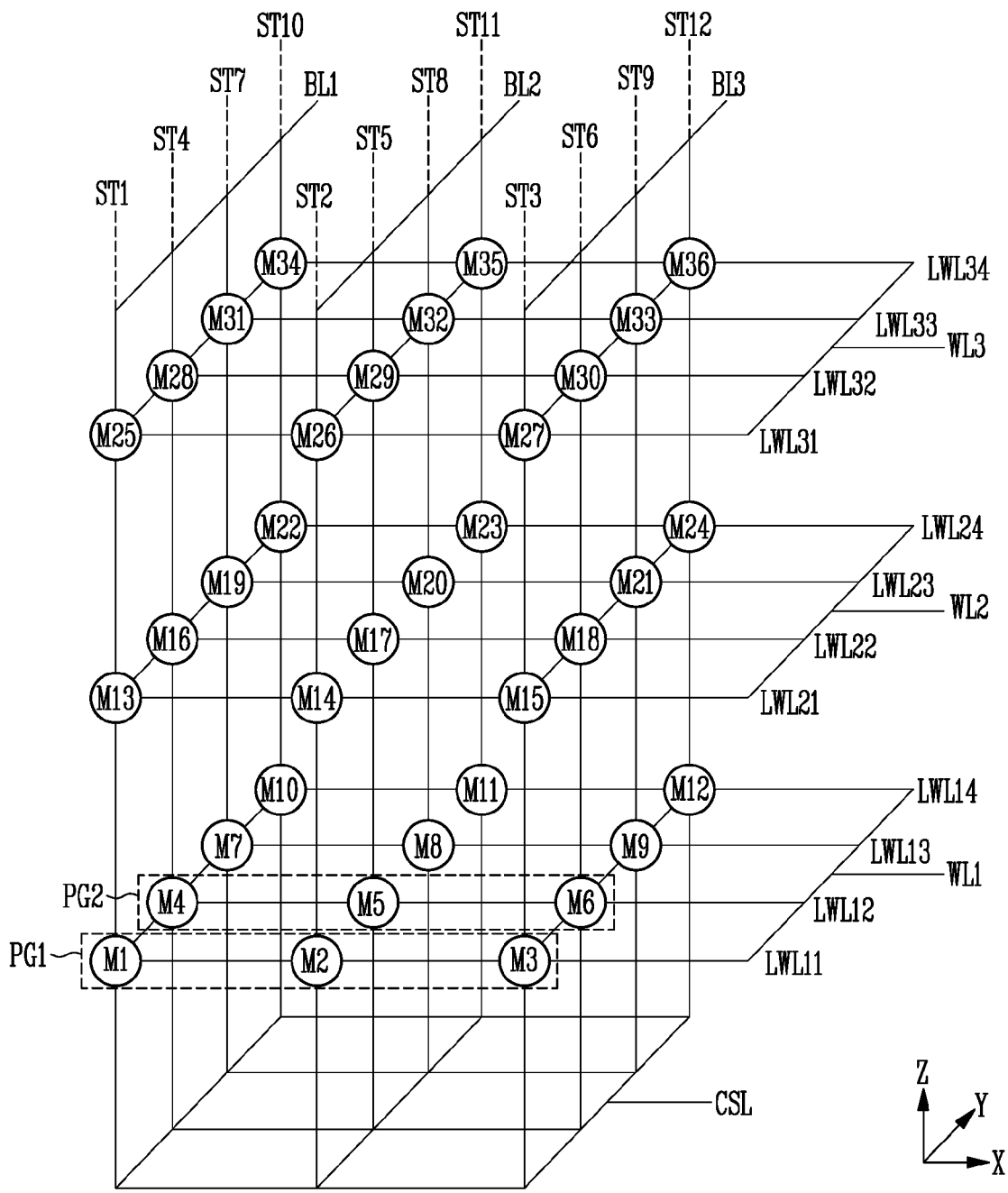
FIG. 5 is a diagram illustrating a memory block having a 3D structure.

FIG. 5 is a diagram illustrating a memory block having a 3D structure.

Referring to FIG. 5, the memory block may include a plurality of memory cells M1 to M36. The plurality of memory cells M1 to M36 may be coupled between bit lines BL1 to BL3 and a common source line CSL. One word line may be coupled in common to four local word lines. For example, a first word line WL1 may be coupled in common to eleventh to fourteenth local word lines LWL11 to LWL14. Memory cells may be coupled to each of the local word lines. A group of memory cells coupled to one local word line may form one physical page (PG). For example, first to third memory cells M1 to M3 coupled to the eleventh local word line LWL11 may form a first physical page PG1. For example, fourth to sixth memory cells M4 to M6 coupled to the twelfth local word line LWL12 may form a second physical page PG2.

One word line may include a number of physical pages identical to the number of local word lines coupled in common thereto.

The number of local word lines coupled to one word line may be determined depending on the number of memory cell strings coupled in common to one bit line. For example, when four memory cell strings are coupled in common to one bit line, four local word lines may be coupled in common to one word line. In this case, one word line may include four physical pages (PG).

One memory cell string may include memory cells coupled in series to each other in a Z direction. For example, a first memory cell string ST1 may include a first memory cell M1, a thirteenth memory cell M13, and a 25-th memory cell M25. Memory cell strings in a Y direction may be coupled to one bit line. For example, the first memory cell string ST1, a fourth memory cell string ST4, a seventh memory cell string ST7, and a tenth memory cell string ST10 may be coupled to the first bit line BL1.

The numbers of word lines, local word lines, memory cell strings, bit lines, and memory cells, illustrated in FIG. 5, are provided for convenience of description, and may be less than or greater than those illustrated in FIG. 5.

Figure 6:
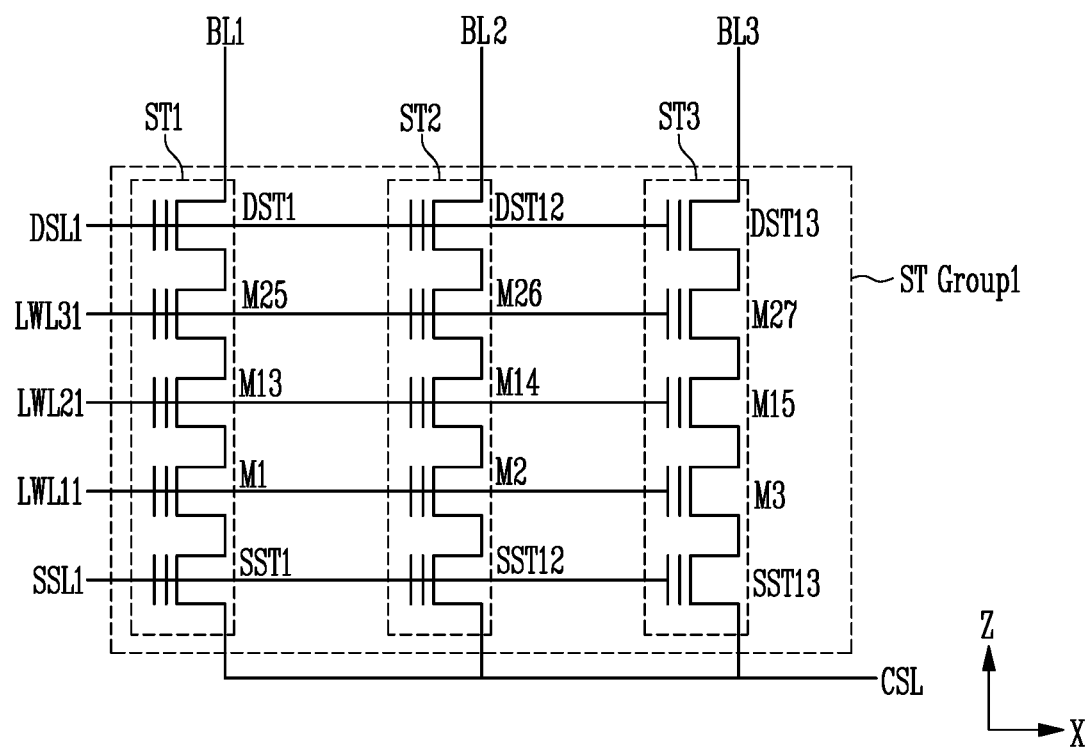
FIG. 6 is a diagram illustrating some memory cell strings illustrated in FIG. 5.

FIG. 6 is a diagram illustrating some memory cell strings illustrated in FIG. 5.

In FIG. 6, a description will be made with reference to FIG. 5. Referring to FIG. 6, the first to third memory cell strings ST1 to ST3 may be coupled to the first to third bit lines BL1 to BL3, respectively. The first to third memory cell strings ST1, ST2, and ST3 may include drain select transistors DST1, DST12, and DST13, respectively, coupled in common to a first drain select line DSL1. The first to third memory cell strings ST1, ST2, and ST3 may include source select transistors SST1, SST12, and SST13, respectively, coupled in common to a first source select line SSL1. Each memory cell string may include memory cells coupled to different local word lines, respectively. For example, the second memory cell string ST2 may include a second memory cell M2, a fourteenth memory cell M14, and a 26-th memory cell M26 coupled to an eleventh local word line LWL11, a 21-st local word line LWL21, and a 31-st local word line LWL31, respectively.

The plurality of memory cell strings coupled between the bit lines and the common source line CSL may form one memory cell string group. For example, the first to third memory cell strings ST1 to ST3 coupled to first to third bit lines BL1 to BL3, respectively, may form a first memory cell string group ST Group1. Similarly, the fourth to sixth memory cell strings ST4 to ST6 illustrated in FIGS. 5 to 6 may form a second memory cell string group. Also, seventh to ninth memory cell strings ST7 to ST9 may form a third memory cell string group, and tenth to twelfth memory cell strings ST10 to ST12 may form a fourth memory cell string group.

The plurality of memory cell strings included in one memory cell string group may be coupled to one drain select line and one source select line. The plurality of memory cell strings included in one memory cell string group may be coupled to different bit lines, respectively.

Figure 7:
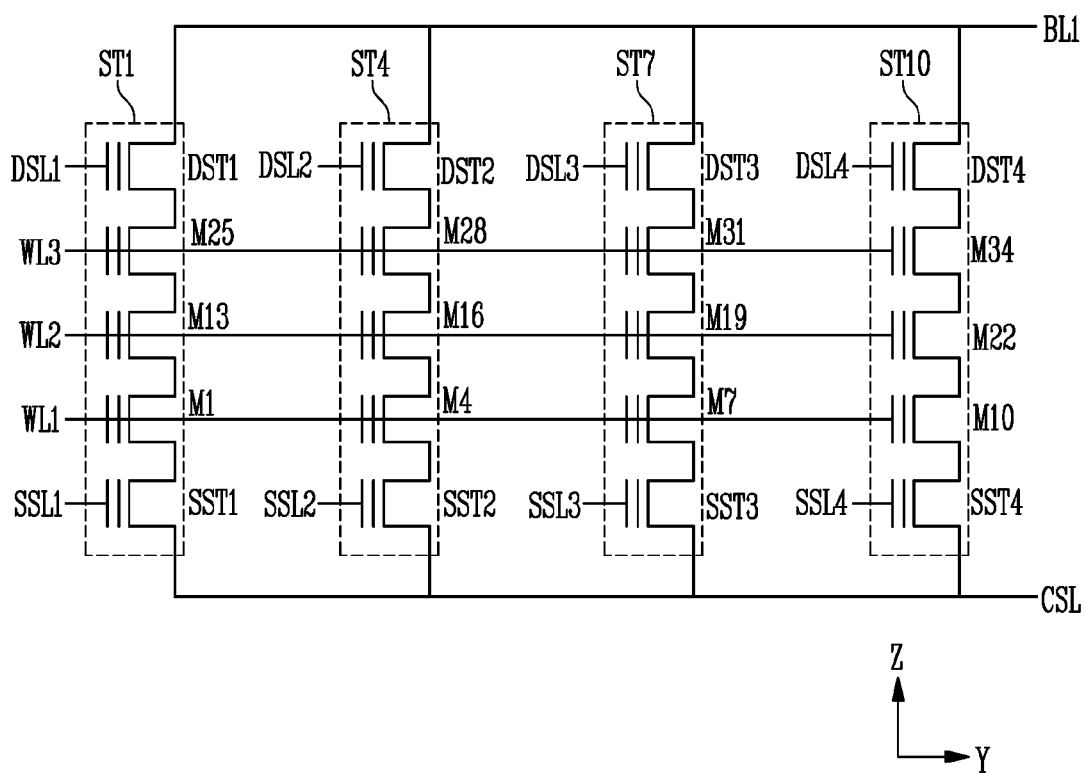
FIG. 7 is a diagram illustrating other memory cell strings illustrated in FIG. 5.

FIG. 7 is a diagram illustrating other memory cell strings illustrated in FIG. 5.

In FIG. 7, a description will be made with reference to FIGS. 5 and 6. Referring to FIG. 7, the first memory cell string ST1, the fourth memory cell string ST4, the seventh memory cell string ST7, and the tenth memory cell string ST10 may be coupled between the first bit line BL1 and the common source line CSL. Respective memory cell strings may be coupled to different drain select lines and different source select lines. For example, the first memory cell string ST1 may be coupled to the first drain select line DSL1 and the first source select line SSL1. The first drain select line DSL1 and the first source select line SSL1 may be coupled in common to the first to third memory cell strings ST1 to ST3. The fourth memory cell string ST4 may be coupled to the second drain select line DSL2 and the second source select line SSL2. The second drain select line DSL2 and the second source select line SSL2 may be coupled in common to the fourth to sixth memory cell strings ST4 to ST6. The seventh memory cell string ST7 may be coupled to the third drain select line DSL3 and the third source select line SSL3. The third drain select line DSL3 and the third source select line SSL3 may be coupled in common to the seventh to ninth memory cell strings ST7 to ST9. The tenth memory cell string ST10 may be coupled to the fourth drain select line DSL4 and the fourth source select line SSL4. The fourth drain select line DSL4 and the fourth source select line SSL4 may be coupled in common to the tenth to twelfth memory cell strings ST10 to ST12.

In an example, unlike the case illustrated in FIG. 7, the first to sixth memory cell strings ST1 to ST6 may be coupled in common to one source select line, and the seventh to twelfth memory cell strings ST7 to ST12 may be coupled in common to one source select line.

Each memory cell string may include memory cells coupled to different word lines, respectively. For example, the fourth memory cell string ST4 may include a fourth memory cell M4, a sixteenth memory cell M16, and a 28-th memory cell M28 coupled to the first word line WL1, the second word line WL2, and the third word line WL3, respectively.

Hereinafter, the program operation of the memory device 100 according to an embodiment of the present disclosure will be described in detail with reference to FIGS. 5 to 7. The memory device 100 may select the first word line WL1 during the program operation on the first to twelfth memory cells M1 to M12. The memory device 100 may perform a plurality of program loops that alternately include a first program loop of programming the first physical page PG1 including the first to third memory cells M1 to M3 and a second program loop of programming the second physical page PG2 including the fourth to sixth memory cells M4 to M6.

In detail, the memory device 100 may select the eleventh local word line LWL11 by selecting the first drain select line DSL1 coupled in common to the first to third memory cell strings ST1 to ST3. The memory device 100 may perform the first program loop on the first physical page PG1 by selecting the first word line WL1 and the first drain select line DSL1, and may perform the second program loop on the second physical page PG2 by selecting the first word line WL1 and the second drain select line DSL2. The memory device 100 may repeatedly perform the first program loop and the second program loop so that respective threshold voltages of the first to sixth memory cells M1 to M6 are increased to respective threshold voltages corresponding to respective target program states.

In an embodiment, after respective threshold voltages of the first to sixth memory cells M1 to M6 have increased to the threshold voltages corresponding to the respective target program states, the memory device 100 may perform a plurality of program loops that alternately include a first program loop of programming a third physical page including the seventh to ninth memory cells M7 to M9 and a second program loop of programming a fourth physical page including the tenth to twelfth memory cells M10 to M12. The third physical page may be selected by the third drain select line DSL3, and the fourth physical page may be selected by the fourth drain select line DSL4.

In an embodiment, the memory device 100 may perform a plurality of program loops, each including a first program voltage apply operation on the first physical page, a second program voltage apply operation on the second physical page, a first verify operation on the first physical page, and a second verify operation on the second physical page.

The conventional memory device 100 performs the program operation on the first physical page PG1 and thereafter performs the program operation on the second physical page PG2. In detail, in conventional technology, after the threshold voltages of the first to third memory cells M1 to M3 included in the first physical page PG1 have increased to respective threshold voltages corresponding to the respective target program states, the threshold voltages of the fourth to sixth memory cells M4 to M6 included in the second physical page PG2 are increased. However, during a program operation on the second physical page PG2, the threshold voltages of the first to third memory cells M1 to M3 may be influenced by the increased threshold voltages of the fourth to sixth memory cells M4 to M6, and may then vary.

Accordingly, the memory device 100 may alternately perform the first program loop of programming the first physical page PG1 and the second program loop of programming the second physical page PG2 in order to solve a phenomenon in which the threshold voltages of the first to third memory cells M1 to M3 included in the first physical page PG1 are varied upon programming the second physical page PG2. The memory device 100 may sequentially increase the threshold voltages of the first to third memory cells M1 to M3 and the threshold voltages of the fourth to sixth memory cells M4 to M6 by alternately performing the first program loop on the first physical page PG1 and the second program loop on the second physical page PG2. The memory device 100 may perform a plurality of program loops that alternately include the first program loop on the first to third memory cells M1 to M3 and the second program loop on the fourth to sixth memory cells M4 to M6 in order to solve a phenomenon in which the threshold voltages of the first to third memory cells M1 to M3 and the fourth to sixth memory cells M4 to M6 that are coupled to one word line are influenced by each other during the program operation.

Referring to FIG. 8, at operation S801, the memory device 100 may perform, in a first program loop, a program voltage apply operation of increasing the threshold voltages of first memory cells selected by a first drain select line. The first memory cells may form a first physical page.

At operation S803, the memory device 100 may perform, in the first program loop, a verify operation of identifying the threshold voltages of the first memory cells.

At operation S805, the memory device 100 may perform, in a second program loop, a program voltage apply operation of increasing the threshold voltages of second memory cells selected by a second drain select line. The second memory cells may form a second physical page. The first physical page and the second physical page may be coupled to one word line.

At operation S807, the memory device 100 may perform, in the second program loop, a verify operation of identifying the threshold voltages of the second memory cells.

At operation S809, the memory device 100 may alternately repeat the first program loop and the second program loop so that the threshold voltages of the first and second memory cells are increased to respective threshold voltages corresponding to respective target program states.

FIG. 9 is a flowchart illustrating a plurality of program loops according to an embodiment of the present disclosure.

Referring to FIG. 9, at operation S901, the memory device 100 may perform, in a first program loop, a first program voltage apply operation of programming a first physical page coupled to a word line.

At operation S903, the memory device 100 may perform, in the first program loop, a second program voltage apply operation of programming a second physical page coupled to the word line.

At operation S905, the memory device 100 may perform, in the first program loop, a first verify operation on the first physical page. The memory device 100 may determine whether the threshold voltages of the first memory cells included in the first physical page have increased to threshold voltages corresponding to a target program state during the first verify operation.

At operation S907, the memory device 100 may perform, in the first program loop, a second verify operation on the second physical page.

At operation S909, the memory device 100 may perform, based on results of the first verify operation and the second verify operation in the first program loop, a second program loop including the first and second program voltage apply operations and the first and second verify operations.

According to the present disclosure, there are provided a memory device that is capable of improving threshold voltage distributions of memory cells during a program operation, and a method of operating the memory device.

While the present teachings have been illustrated and described with respect to the specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A method of operating a memory device, comprising:
    performing a first program loop of increasing threshold voltages of first memory cells selected by a first drain select line among a plurality of memory cells coupled to a word line;
    performing a second program loop of increasing threshold voltages of second memory cells selected by a second drain select line among the plurality of memory cells; and
    alternately repeating the first program loop and the second program loop such that respective threshold voltages of the first memory cells and the second memory cells are increased to respective threshold voltages corresponding to respective target program states.

2. The method according to claim 1, wherein each of the first program loop and the second program loop comprises:
    a program voltage apply operation of applying a program voltage to the word line, and
    a verify operation of identifying whether the threshold voltages of the first memory cells and the second memory cells have increased to the respective threshold voltages corresponding to the respective target program states.

3. The method according to claim 1, wherein the first program loop and the second program loop use program voltages having an identical magnitude.

4. The method according to claim 1,
    wherein the performing the first program loop comprises determining, based on a number of on-cells identified by a first verify operation among the first memory cells, whether the first verify operation has passed or failed, and
    wherein the performing the second program loop comprises determining, based on a number of on-cells identified by a second verify operation among the second memory cells, whether the second verify operation has passed or failed.

5. The method according to claim 4, wherein the alternately repeating the first program loop and the second program loop comprises performing a plurality of program loops that alternately include the first program loop and the second program loop in response to a fail in the first verify operation of the first program loop, and a fail in the second verify operation of the second program loop.

6. The method according to claim 2, wherein the alternately repeating the first program loop and the second program loop comprises increasing a magnitude of the program voltage at each of the alternately repeating first program loop and second program loop based on a number of times that the first program loop and the second program loop alternately repeat.

7. The method according to claim 1,
    wherein respective program voltages used in the first program loop and the second program loop have an identical magnitude, and
    wherein the alternately repeating the first program loop and the second program loop comprises increasing the magnitude at each of the alternately repeating first program loop and second program loop based on a number of times that the first program loop and the second program loop alternately repeat.

8. The method according to claim 1, further comprising:
    performing the first program loop on third memory cells selected by a third drain select line among the plurality of memory cells after respective threshold voltages of the first memory cells and the second memory cells have increased to the threshold voltages corresponding to the target program state;
    performing the second program loop on fourth memory cells selected by a fourth drain select line among the plurality of memory cells; and
    alternately repeating the first program loop and the second program loop such that respective threshold voltages of the third memory cells and the fourth memory cells are increased to respective threshold voltages corresponding to respective target program states.

9. A method of operating a memory device, comprising:
performing, in a first program loop, a first program voltage apply operation of programming a first physical page coupled to a word line;
performing, in the first program loop, a second program voltage apply operation of programming a second physical page coupled to the word line;
performing, in the first program loop, a first verify operation of identifying threshold voltages of first memory cells included in the first physical page;
performing, in the first program loop, a second verify operation of identifying threshold voltages of second memory cells included in the second physical page; and
performing, based on results of the first verify operation and the second verify operation in the first program loop, a second program loop including the first and second program voltage apply operations and the first and second verify operations.

10. The method according to claim 9, further comprising selecting the first physical page and the second physical page through respective drain select lines.

11. The method according to claim 9, wherein the first program voltage apply operation and the second program voltage apply operation are performed using an identical program voltage in each of the first and second program loops.

12. The method according to claim 9, wherein the first and second program voltage apply operations in the second program loop are performed using a higher program voltage than a program voltage used in the first and second program voltage apply operations in the first program loop.

13. The method according to claim 9, wherein performing the second program loop comprises:
determining, based on a number of on-cells identified by the first verify operation in the first program loop among the first memory cells, whether the first verify operation in the second program loop has passed or failed while the first program voltage apply operation is performed in the second program loop; and
determining, based on a number of on-cells identified by the second verify operation in the first program loop among the second memory cells, whether the second verify operation in the second program loop has passed or failed while the second program voltage apply operation is performed in the second program loop.

14. The method according to claim 13, further comprising performing a third program loop including the first and second program voltage apply operations and the first and second verify operations in response to fails in the first and second verify operations in the second program loop.

15. The method according to claim 13, further comprising performing a third program loop including the first program voltage apply operation and the first verify operation in response to a fail in the first verify operation in the second program loop and a pass in the second verify operation in the second program loop.

16. A memory device, comprising:
a plurality of memory cell string groups, each including a plurality of memory cell strings;
a peripheral circuit configured to perform a program operation of storing data in first and second physical pages, the first physical page being included in a first one of the plurality of memory cell string groups and the second physical page being included in a second one of the plurality of memory cell string groups; and
a program operation controller configured to control the peripheral circuit to perform, during the program operation, a plurality of program loops that alternately include first and second program loops, the first program loop programming the first physical page and the second program loop programming the second physical page.

17. The memory device according to claim 16, wherein each of the first program loop and the second program loop comprises:
a program voltage apply operation of applying a program voltage to a word line coupled to the first physical page and the second physical page, and
a verify operation of identifying whether respective threshold voltages of first memory cells included in the first physical page and second memory cells included in the second physical page have increased to respective threshold voltages corresponding to respective target program states.

18. The memory device according to claim 17, wherein the program operation controller is configured to control the peripheral circuit further to perform, after performing the plurality of program loops, the second program loop in response to a pass in the verify operation on the first memory cells in the first program loop, and a fail in the verify operation on the second memory cells in the second program loop.

19. The memory device according to claim 17, wherein the program operation controller is configured to control the peripheral circuit further to perform, after performing the plurality of program loops, the first program loop in response to a fail in the verify operation on the first memory cells in the first program loop, and a pass in the verify operation on the second memory cells in the second program loop.

20. The memory device according to claim 16, wherein the program operation controller is configured to control the peripheral circuit further to alternately repeat, after performing the plurality of program loops, the first program loop of programming a third physical page included in a third one of the plurality of memory cell string groups and the second program loop of programming a fourth physical page included in a fourth one of the plurality of memory cell string groups.

* * * * *